United States Patent Office 2,728,585
Patented Dec. 27, 1955

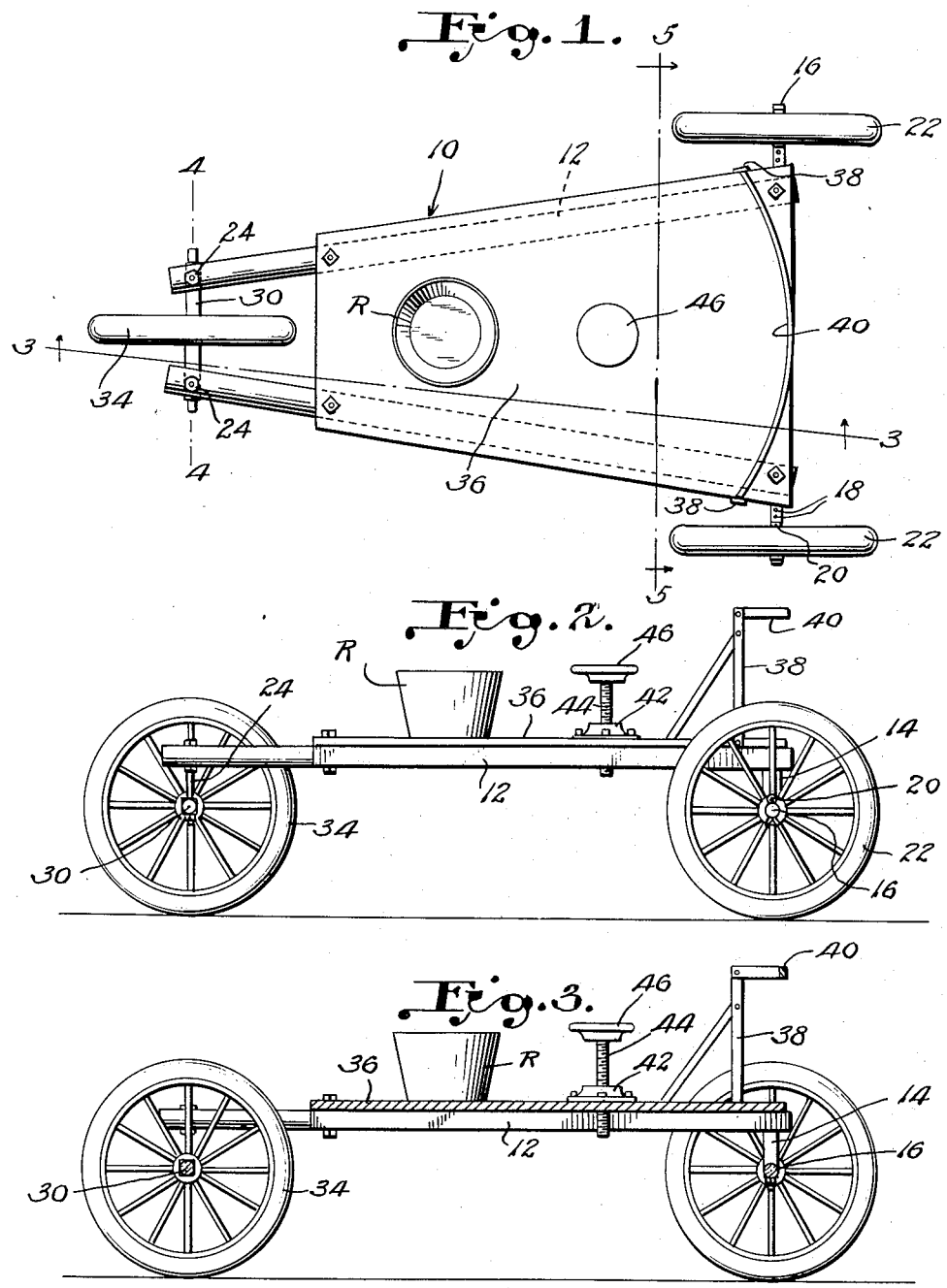

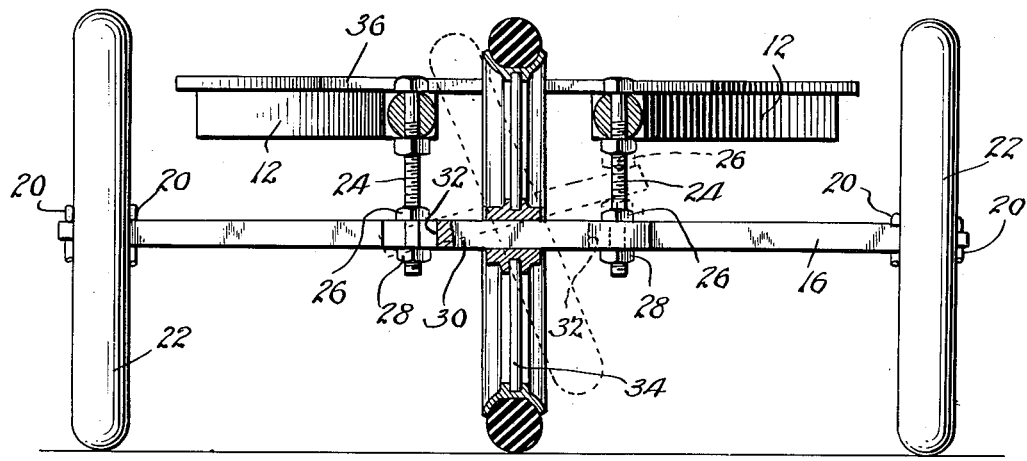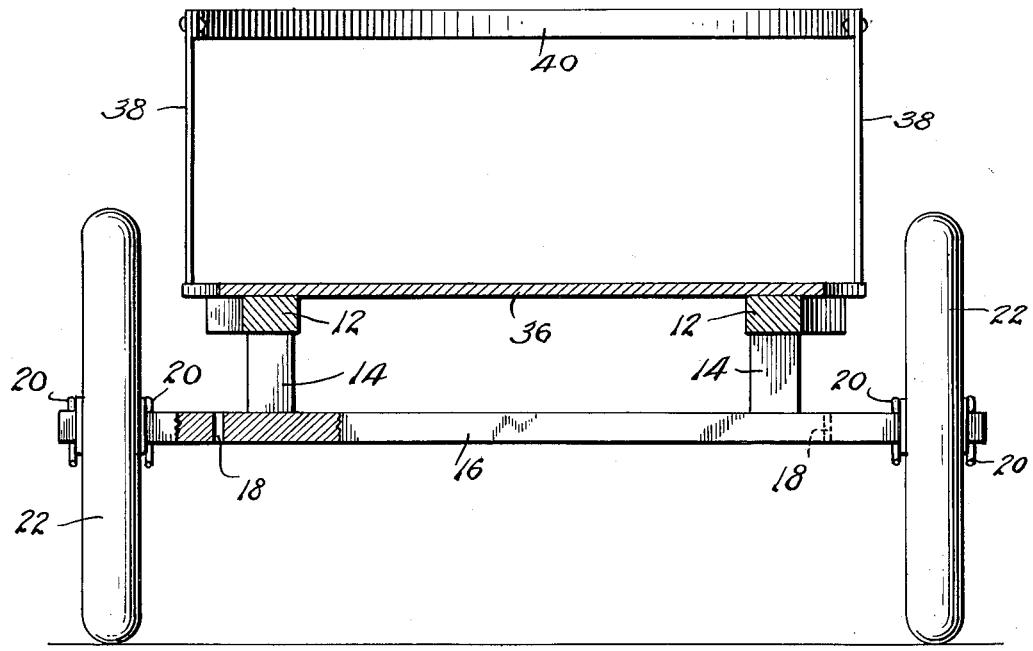

2,728,585
GARDENER'S WHEEL CART
William H. Walline, Wichita, Kans.
Application September 26, 1952, Serial No. 311,617
1 Claim. (Cl. 280—62)

This invention relates to a gardener's cart and has for its primary object to facilitate the planting, cultivating, and harvesting of garden crops.

Another object is to enable the cart to be moved through a field in such a manner that the wheels of the cart will escape contact with the crops planted in rows in the field.

The above and other objects may be attained by employing this invention which embodies among its features a pair of elongated spaced divergent side bars, a front axle carried by the side bars adjacent the divergent ends thereof, ground wheels mounted on the axle for rotation about the longitudinal axis thereof and adjustable longitudinally thereon, vertically extending studs carried by the side bars adjacent the convergent ends thereof, a spindle carried by the studs below the side bars for adjustment longitudinally on the studs, a ground wheel carried by the spindle for rotation about the axis thereof, and a platform carried by the side bars for supporting a gardener on the cart.

Other features include a back rest carried by the platform and extending upwardly therefrom between the front wheels and the axle having a longitudinally extending row of longitudinally spaced openings extending therethrough adjacent opposite ends thereof, and pins extending through the openings and holding the front ground wheels in selected positions on the axle.

In the drawings,

Figure 1 is a plan view of a cart embodying the features of this invention,

Figure 2 is a side view of the cart illustrated in Figure 1,

Figure 3 is a longitudinal sectional view taken substantially on the line 3—3 of Figure 1, Figure 4 is an enlarged sectional view taken substantially on the line 4—4 of Figure 1, and Figure 5 is an enlarged sectional view taken substantially on the line 5—5 of Figure 1.

Referring to the drawings in detail the cart designated generally 10 comprises a pair of spaced divergent side bars 12 carrying, adjacent divergent ends, downwardly extending brackets 14, upon which are supported in downwardly spaced relation from the side bars 12 a front axle 16. This axle is provided adjacent opposite ends with longitudinal rows of longitudinally spaced openings 18 for the reception of suitable pins 20 forming guides for the hubs of ground wheels 22. By removing the pins and shifting the wheels longitudinally with relation to the axle 16, the wheels may be moved laterally of the cart to escape rows of growing crops, when the cart is employed for cultivating or harvesting the crops.

Carried by and extending downwardly from the side bars 12 adjacent the convergent ends thereof are vertically extending studs 24 which are preferably externally screw threaded for receiving adjusting nuts 26 and 28. A spindle or rear axle 30 is provided adjacent opposite ends with longitudinal slots 32 for the reception of the studs 24 and as illustrated in Figure 4, this spindle extends between the studs and is held in adjusted position thereon by the nuts 26 and 28. A ground wheel 34 is carried by the spindle or rear axle 30 and rotates between the convergent ends of the side bars 12 to support the trailing end of the cart. With this structure the ground wheel 34 can be tilted laterally, Fig. 4, and held in such adjusted position by proper placement of adjusting nuts 26 and 28. This is necessary at times when the cart is to be used where the planted rows are closely spaced, as a matter of convenience and to avoid any possible damage to the plants.

Secured to the upper sides of the rails 12 is a platform 36 which extends from the front axle 16 toward the convergent ends of the side rails, but stops short of the studs 24 to provide a space in which the wheel 34 may rotate.

Carried by the platform 36 adjacent the forward end thereof and extending upwardly from opposite sides thereof are supports 38 carrying adjacent their upper ends a horizontally extending bar 40 forming a back rest against which the occupant of the cart may rest his back during the periods that the cart is in use. A suitable nut 42 is carried by the platform 36 for threadedly receiving a threaded standard 44 carrying at its upper end a seat 46 which may be adjusted vertically relative to the platform by rotation of the threaded standard 44 through the nut 42.

In use the occupant resting on the seat 46 and resting his back against the back rest may propel the cart by engaging the ground with his feet and by adjusting the wheels 22 longitudinally on the axle 16, the cart may be made to escape contact with the crops in rows of growing crops. A suitable receptacle R may be placed on the platform 36 between the seat 46 and the wheel 34 to hold seedlings during planting or to receive crops while being harvested. And with the occupant occupying the seat 46, it is obvious that the contents of the receptacle R will be readily available for planting or the receptacle R will be handily located for receiving the harvested crops.

While in the foregoing there has been shown and described the preferred embodiment of this invention it is to be understood that minor changes in the details of construction, combination and arrangement of parts may be resorted to without departing from the spirit and scope of the invention as claimed.

What is claimed is:

A gardener's cart comprising a pair of elongated spaced divergent side bars, a front axle carried by each of the side bars adjacent the divergent ends thereof, ground wheels mounted on the axle for rotation thereon, vertically extending studs carried by the side bars adjacent the convergent ends thereof, spindle means carried by the studs below the side bars, means on said studs for adjusting said spindle means longitudinally along said studs, a ground wheel carried by the spindle means and between the side bars for rotation thereon, a platform carried by the side bars, a vertically adjustable seat on said platform for supporting a gardener and a back rest carried by the platform spaced from said seat and extending upwardly between the front wheels, said axle having a longitudinally extending row of longitudinally spaced openings extending therethrough adjacent opposite ends thereof and outwardly of said bars, and pins extending through the openings and holding the front ground wheels in selected positions on the axle.

References Cited in the file of this patent
UNITED STATES PATENTS

| Number | Name | Date |
|---|---|---|
| 471,042 | Warren et al. | Mar. 15, 1892 |
| 518,462 | Loomis | Apr. 17, 1894 |
| 764,447 | Franek | July 5, 1904 |
| 1,166,463 | King | Jan. 4, 1916 |
| 2,033,037 | Lang | Mar. 3, 1936 |
| 2,377,959 | Peters | June 12, 1945 |